United States Patent
Kuwabara (10) Patent No.: US 7,927,016 B2
(45) Date of Patent: Apr. 19, 2011

(54) SLIDER FOR LINEAR MOTION ROLLING GUIDE UNIT

(75) Inventor: Hideki Kuwabara, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 318 days.

(21) Appl. No.: 12/212,036

(22) Filed: Sep. 17, 2008

(65) Prior Publication Data

US 2009/0074335 A1 Mar. 19, 2009

(30) Foreign Application Priority Data

Sep. 13, 2007 (JP) ................................ 2007-238250

(51) Int. Cl.
*F16C 29/06* (2006.01)
(52) U.S. Cl. ............................................. 384/13; 384/44
(58) Field of Classification Search .................... 384/13, 384/44

See application file for complete search history.

(56) References Cited

U.S. PATENT DOCUMENTS

| | | | |
|---|---|---|---|
| 6,024,490 A * | 2/2000 | Shirai | 384/13 |
| 6,203,199 B1 * | 3/2001 | Pfeuffer | 384/45 |
| 6,250,804 B1 * | 6/2001 | Hsu et al. | 384/13 |
| 7,534,042 B2 * | 5/2009 | Kuwabara | 384/13 |
| 2006/0023980 A1 * | 2/2006 | Kato et al. | 384/43 |
| 2008/0080795 A1 * | 4/2008 | Kuwabara et al. | 384/13 |

FOREIGN PATENT DOCUMENTS

JP 2007100951 4/2007

* cited by examiner

*Primary Examiner* — Thomas R Hannon (74) *Attorney, Agent, or Firm* — Cozen O'Connor (57) ABSTRACT

A slider for a linear motion rolling guide unit can ensure a smooth rolling movement and a reliable lubricating capability and eliminate the need for accurate dimension control to reduce the manufacturing costs. A turning corner 9 in an end cap 2 is made up of a pair of arced paths 9c connecting with a rolling path in the casing 1, and a straight path 9d providing a connection between the arced paths 9c and extending in a direction approximately perpendicular to the rolling path. The lubricating member A mounted in the end cap 2 has a lubricating face 18a exposed to the linear path 9d, and maintains a relation of the lubricating face 18a intersecting the outer peripheral faces of the arced paths 9c. A recessed area 19 is formed between the outer peripheral face of each arced path and the lubricating face 18a in a surplus length region extending outward from the intersection between the lubricating face 18a and the outer peripheral face of the arced path 9c.

1 Claim, 9 Drawing Sheets

SLIDER FOR LINEAR MOTION ROLLING GUIDE UNIT

BACKGROUND OF THE INVENTION

1. Field of the Invention

This invention relates to a slider used in a linear motion rolling guide unit and causing rolling elements to roll on raceway faces provided on a track rail to achieve a smooth relative movement on the rail.

2. Description of the Related Art

Conventionally, this type of slider for a linear motion rolling guide unit is known from JP-2007-100951A.

Figure 9:
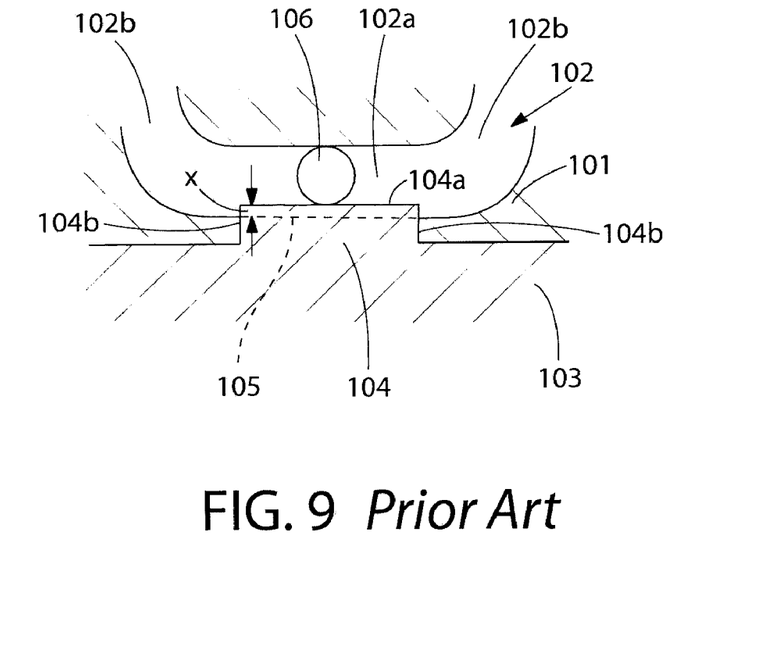
FIG. 9 is a diagram illustrating a conventional lubricating member.

The slider comprises a casing and end caps secured at the two ends of the casing, and provides for circulation paths which are made up of rolling paths formed in the casing and turning corners formed in the end caps for allowing the rolling elements to move around the circulation paths. The end caps have mounted on them lubricating members impregnated with a lubricant. A portion of each of the lubricating members is exposed to the inside of each of the turning corners formed in the end caps. FIG. 9 shows a specific structure of the lubricating member and the turning corner.

As illustrated in FIG. 9, a turning corner 102 is formed in an end cap 101. The end cap 101 is coupled to a casing which is not shown but located above the end cap 101 in FIG. 9, so that the two ends of the turning corner 102 are each connected directly to a rolling path formed in the casing.

The turning corner 102 is made up of a linear straight path 102a and arced paths 102b directly adjoining the straight path 102a and having a predetermined curvature.

On the other hand, the end cap 101 is fitted with a lubricating member 103. The lubricating member 103 has a raised fitting portion 104 exposed to the straight path 102a of the turning corner 102. The leading end face of the raised fitting portion 104 has a lubricating face 104a which is parallel to the straight path 102a.

A plurality of rolling elements 106 are installed in the turning corner 102, and roll through the turning corner 102. The rolling elements 106 make contact with the lubricating face 104a in the process of rolling in the straight path 102a, and are coated with the lubricant held in the lubricating member 103 and dispensed from the lubricating face 104a.

In this manner, because the rolling elements 106 are lubricated during their passage through the turning corner 102, the smooth rolling of the rolling elements 106 can be maintained for a long time.

In order to lubricate the rolling elements 106 as described above, it follows that the lubricating face 104a is required to protrude beyond or to be flush with the outer periphery face 105 of the turning corner 102.

However, if the lubricating face 104a projects too much beyond the outer periphery face 105 so as to increase the protrusion y created between the outer periphery face 105 and the lubricating face 104a, this obstructs the smooth rolling of the rolling elements 106. On the other hand, if the lubricating face 104a is slightly lower than the outer periphery face 105, the rolling elements 106 cannot be completely lubricated.

For the purpose of reliably making full use of the lubricating capability without inhibiting the rolling movement of the rolling elements 106, it is necessary to ensure accurate dimensions such that the lubricating face 104a and the outer peripheral face 105 are flush with each other. For this purpose, a complicated manufacturing process and intricate assembling process are required, resulting in an increase in manufacturing costs.

SUMMARY OF THE INVENTION

It is an object of the present invention to provide a slider for a linear motion rolling guide unit which is capable of ensuring a smooth rolling movement and a reliable lubricating capability and also of eliminating the need for accurate dimension control to reduce the manufacturing costs.

The present invention provides a slider for a linear motion rolling guide unit comprising: a casing having rolling paths for guiding rolling elements; a pair of end caps fixed respectively to two opposing ends of the casing and having turning corners formed therein, the turning corners directly connecting with the rolling paths; and a lubricating member provided either one or both of the pair of end caps and having a lubricating face exposed on an outer peripheral face of each of the turning corners. The rolling paths and the turning corners form circulation paths through which the rolling elements roll and circulate. The rolling elements make contact with the lubricating faces and are lubricated in the process of rolling through the turning corners.

On condition of the above structure, the slider of the present invention is characterized in that each of the turning corners is made up of a pair of arced paths directly connecting with the rolling path of the casing, and a straight path providing a connection between the pair of the arced paths and extending in a direction approximately perpendicular to the rolling path, and in that the lubricating member has a lubricating face exposed to the straight path and maintains a relation of the lubricating face intersecting the outer peripheral faces of the pair of the arced paths.

The slider is further characterized by recessed areas that are each formed between the outer peripheral face of each of the pair of the arced paths and a surplus length region of the lubricating face extending outward from an intersection of the lubricating face with the outer peripheral face of the arced path.

According to the present invention, the length of the lubricating face is longer than the length of the straight path, and the recessed areas are formed between the lubricating face and the outer peripheral face in the respective surplus length regions. Accordingly, even if a dimensional error caused in the manufacturing process leads to an increase in the amount of protrusion of the lubricating face into the arced path, the dimensional error is absorbed by the recessed area. As a result, an unnecessary difference in level is not produced between the outer peripheral face of the turning corner and the lubricating face.

In short, according to the present invention, even if a dimensional error or an assembly error occurs in the lubricating member, the end cap and the like, the dimensional error can be absorbed by the recessed area, so that an unnecessary difference in level is not produced between the lubricating face and the turning corner, and additionally, the rolling elements can be reliably and sufficiently lubricated.

Then, such absorption of the dimensional error or the assembly error eliminates the need of precision dimensional control, thus achieving easy assembling process. As a result, the degree of flexibility in design is increased, making it possible to significantly reduce the costs in the manufacturing process.

Further, because the recessed areas also have the function of accumulating oil, abraded powder and the like, the sliding movement of the slider is made smoother.

BEST MODE FOR CARRYING OUT THE INVENTION

A slider for a linear motion rolling guide unit according to the present invention will be described below with reference to FIG. 1 to FIG. 8.

Figure 1:
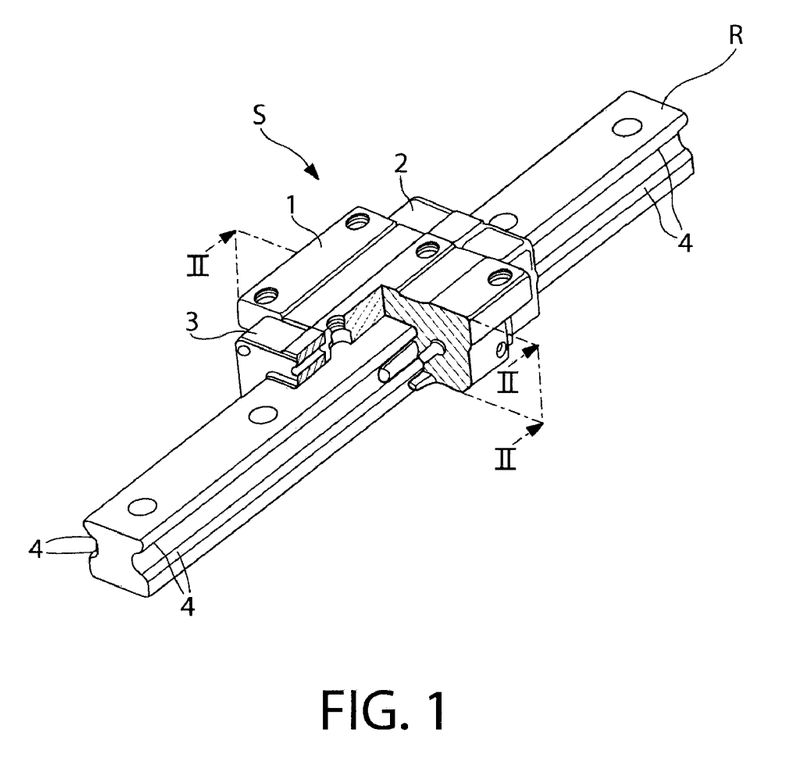
FIG. 1 is a three-dimensional view of a linear motion rolling guide unit in an embodiment of the present invention.
Figure 2:
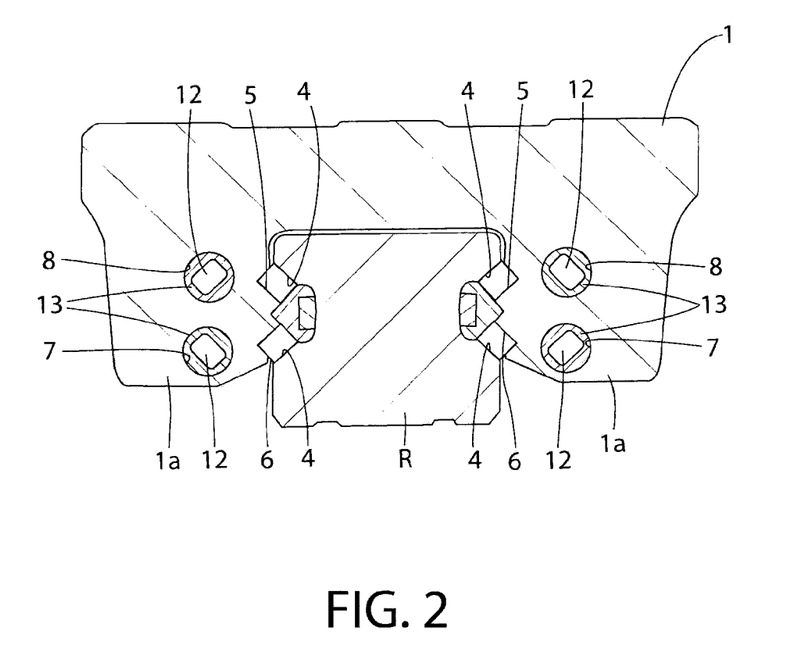
FIG. 2 is a sectional view taken along the II-II line in FIG. 1.

As illustrated in FIG. 1, a slider S of the present invention, which slides in the longitudinal direction of a track rail R, comprises a casing 1 and a pair of end caps 2, 3 respectively attached to the two ends of the casing 1. As shown in FIG. 2, the casing 1 has a pair of arms 1a. The pair of arms 1a respectively face the opposing side faces of the track rail R when the casing 1 straddles the track rail R.

Two pairs of race faces 4 are respectively formed on the opposing side faces of the track rail R. The arms 1a respectively have the two pairs of race paths 5, 6 formed in such a way to each face the race face 4. In addition, the arms 1a respectively have the two pairs of through holes 7, 8 extending therethrough along the longitudinal direction of the casing 1.

Each of the race paths 5 and each of the through holes 7 form a rolling path of the present invention. Likewise, each of the race paths 6 and each of the through holes 8 form a rolling path of the present invention. The later-described rolling elements roll in each of the rolling paths.

Figure 3:
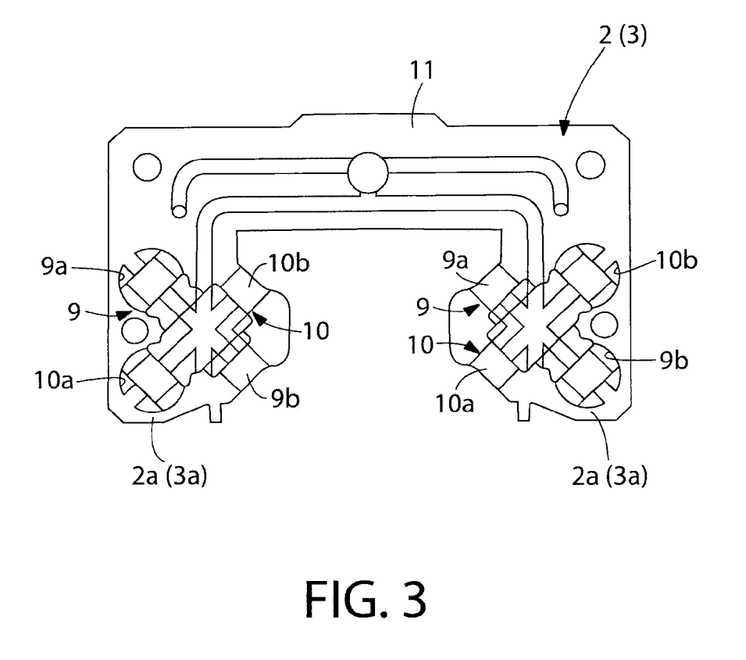
FIG. 3 is a front view of the face of the end cap which is fixed to a casing.

On the other hand, the end cap 2 has a pair of arms 2a facing the side faces of the track rail R as in the case of the pair of arms 1a of the casing 1 as illustrated in FIG. 3. Likewise, the end cap 3 has a pair of arms 3a facing the side faces of the track rail R, as indicated with the reference numerals inside the parentheses in FIG. 3. Each of the arms 2a (3a) has turning corners 9, 10 formed therein and each shaped in a U-shaped hole form. The turning corner 9 has open ends 9a, 9b opening on the face 11 of the end cap 2, and the turning corner 10 has open ends 10a, 10b opening on the face 11 of the end cap 2.

The turning corners 9, 10 differ in depth from each other, so that the turning corner 9, 10 do not join each other although they intersect each other as shown in FIG. 3.

Figure 4:
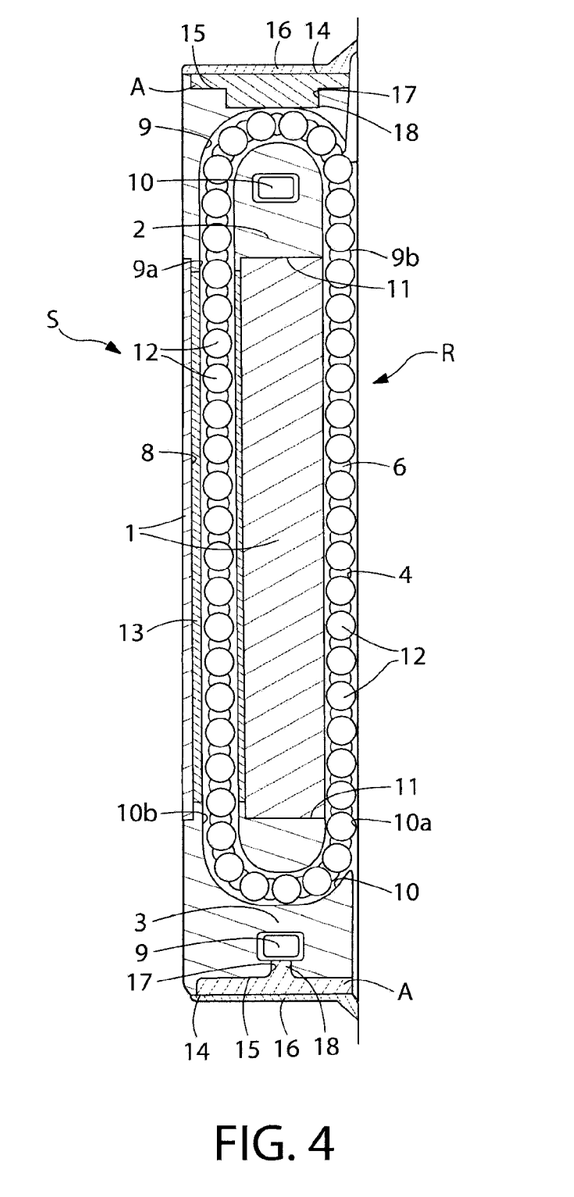
FIG. 4 is a sectional view illustrating the circulation path of a slider in FIG. 1.

The faces 11 of the respective end caps 2, 3 structured as described above are fixedly attached respectively to the opposing ends of the casing 1 in the longitudinal direction, which is illustrated in FIG. 4.

As seen from FIG. 4, when the end caps 2, 3 are respectively attached to the opposing ends of the casing 1, each through hole 8 formed in the casing 1 is connected to the open end 9a of the turning corner 9 in the end cap 2 and to the open end 10b of the turning corner 10 in the end cap 3.

Likewise, the race path 6 formed in the casing 1 is connected to the open end 9b of the turning corner 9 in the end cap 2 and to the open end 10a of turning corner 10 in the end cap 3.

As a result, a rolling path made up of the race path 6 and the through hole 8, and the tuning corners 9, 10 form a circulating path. The rolling elements 12 are mounted in and roll through the circulating path.

The slider S straddles the track rail R, and then slides on the track rail R in the longitudinal direction of the track rail R, whereupon the rolling elements 12 roll between each race path 6 of the casing 1 and the corresponding race face 4 of the track rail R. Likewise, the rolling elements 12 roll between each race path 5 of the casing 1 and the corresponding race face 4 of the track rail R, which is not clear from FIG. 4 (see FIG. 2). In this manner, the rolling elements 12 are rotatably interposed between the track rail R and the slider S, thus achieving the smooth sliding movement of the slider S on the track rail R.

For maintaining the smooth relative movement of the slider S to the track rail R for a long time, the rolling elements 12 are required to be coated with a lubricant. What play a role in this purpose are sleeves 13 inserted into the through holes 7, 8 and lubricating members A fitted into the end caps 2, 3.

The sleeve 13 and the lubricating member A are formed of a molded porous part made of sintered resin. The molded porous part has a porous portion which is formed of a sintered resin produced by compressing and heating a fine powder of an ultra high molecular weight synthetic resin, with the voids between the fine synthetic resin particles being thus retained in shape so as to make interconnection. As a result, the molded porous part can be impregnated with a lubricant.

Accordingly, in the process of the passage of the rolling elements 12 through the through holes 7, 8, the lubricant contained in the sleeve 13 is applied to the surfaces of the rolling elements 12 to lubricate the rolling elements 12.

Also, the rolling elements 12 are lubricated by the lubricating members A while passing through the turning corners 9 formed in the end caps 2, 3. The structure of the end cap 2 and the lubricating member A will be described below in detail.

Figure 5:
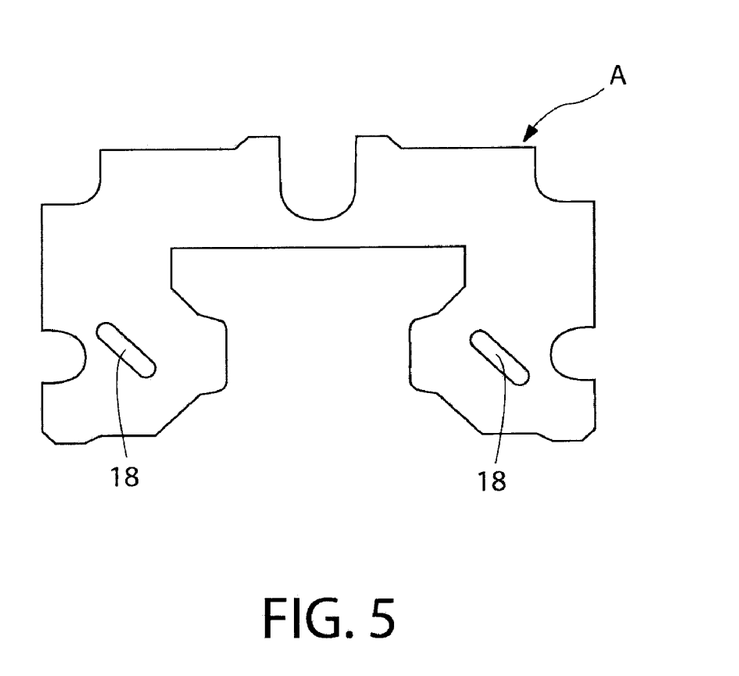
FIG. 5 is a plane view illustrating a lubricating member.
Figure 6:
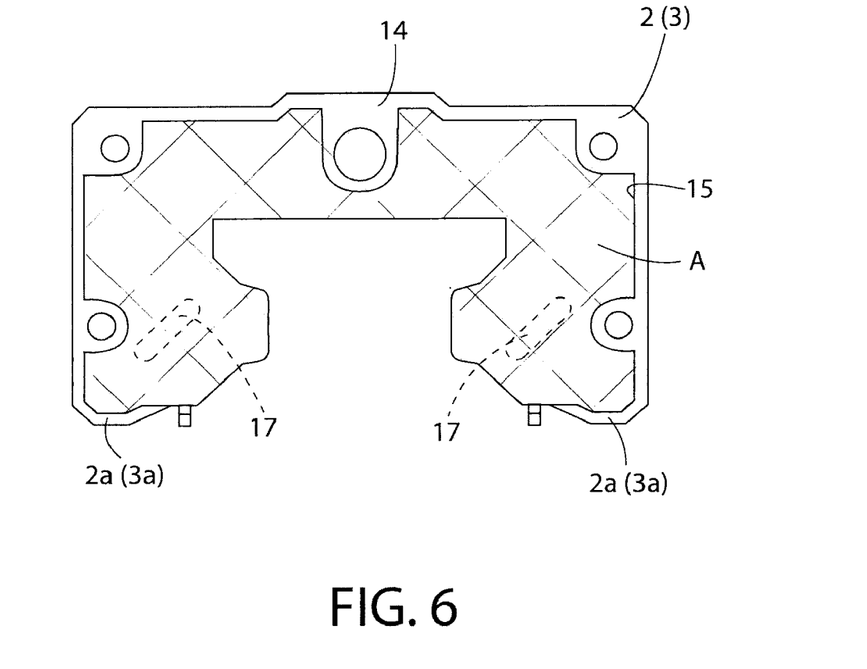
FIG. 6 illustrates the end cap mounted with the lubricating member, which is a front view of the face of the end cap opposite to the face attached to the casing.

FIG. 5 illustrates the lubricating member A formed of the molded porous part. FIG. 6 illustrates the end cap 2 (3) mounted with the lubricating member A. As shown in FIG. 6, the face 14 of the end cap 2 (3) is the reverse of the aforementioned face 11. A receiving recess 15 is formed in the face 14 to have the bottom face slightly lower than the face 14. The lubricating member A is fitted into the receiving recess 15.

When the lubricating member A is fitted into the receiving recess 15, the lubricating member A is flush with the face 14 of the end cap 2 (3). After the lubricating member A has been fitted into the receiving recess 15, an end seal 16 is fixed to the face 14 (see FIG. 4).

A lubricating hole 17 is formed through each of the arms 2a (3a) of the end cap 2 (3), and extends from the face 11 to the face 14. As is seen from FIG. 4, on the face 11 of the end cap 2, or the end cap 3, the lubricating hole 17 has the open end opening on the outer peripheral face of the turning corner 9.

On the other hand, the lubricating member A has raised fitting portions 18 each fitted into the lubricating hole 17 when the lubricating member A is placed in the receiving recess 15 of the end cap 2, or the end cap 3. The relationship between the raised fitting portion 18 and the turning corner 9 will be described below in detail with reference to FIG. 7 and FIG. 8.

Figure 7:
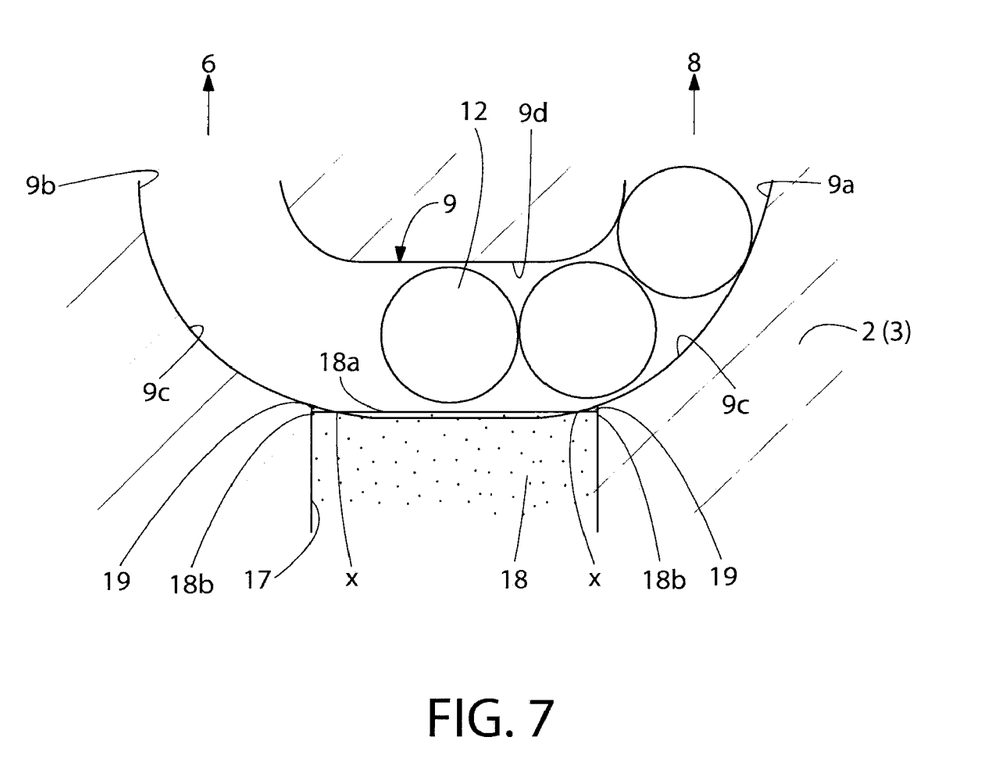
FIG. 7 is a sectional view showing the relationship between the lubricating face and the turning corner.

As shown in FIG. 7, each of the turning corners 9 formed in the end cap 2 (3) is made up of open ends 9a, 9b connected to the rolling path (made up of a race path 6 and a through hole 8) of the casing 1; a pair of arced paths 9c respectively adjoining the open ends 9a, 9b and having a predetermined curvature; and a straight path 9d interposed between and adjoining the two arced paths 9c and extending approximately perpendicular to the rolling path.

On the other hand, the raised fitting portion 18 provided in the lubricating member A extends through the lubricating hole 17 so that the lubricating face 18a formed on the leading end of the raised fitting portion 18 is exposed to the straight path 9d.

The length of the lubricating face 18a is longer than the length of the straight path 9d of the turning corner 9. The lubricating face 18a and the straight path 9d have the dimensional relationship such that, when the lubricating face 18a is exposed on the straight path 9d, the lubricating face 18a crosses, at two intersections x, the outer peripheral faces of the two arced paths 9c adjacent the straight path 9d, and the opposing ends 18b of the lubricating face 18a are located outward beyond the intersections x.

In addition, recessed areas 19 are respectively formed between the outer peripheral faces of the arced paths 9c and portions of the lubricating face 18a respectively located outward beyond the intersections x, that is, and portions of the lubricating face 18a each ranging from the intersection x to an end 18b closest to this intersection.

Figure 8:
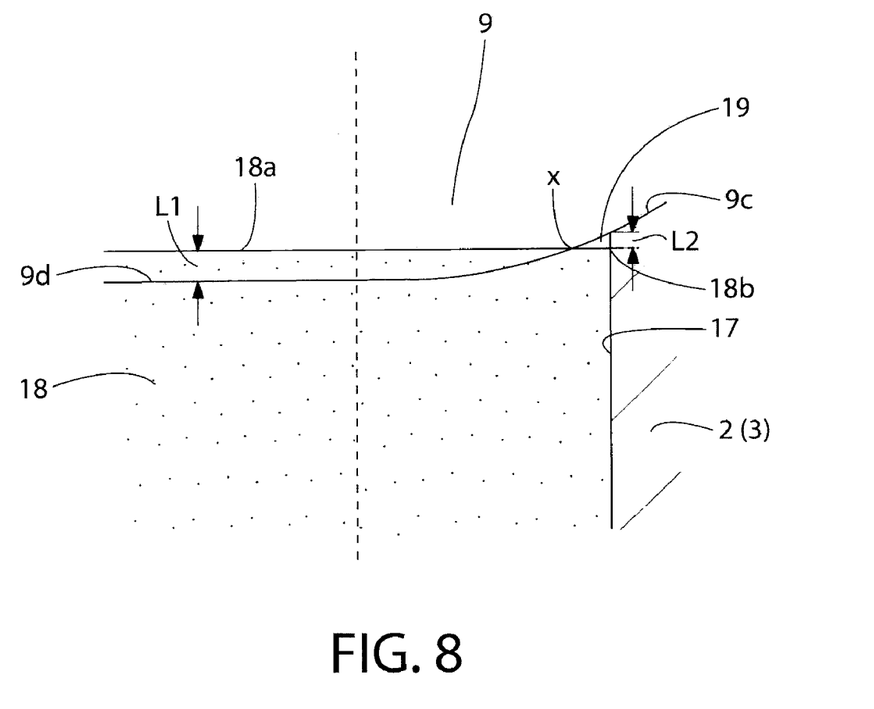
FIG. 8 is an enlarged view of a part in FIG. 7.

As illustrated in FIG. 8, the arrows L1 denotes the amount of protrusion of the lubricating face 18a from a portion of the outer peripheral face of the straight path 9d between the dotted lines shown in FIG. 7, while the arrows L2 denotes the length from each of the ends 18b of the lubricating face 18a to the outer peripheral face of the corresponding arced path 9c, that is, the depth of the recessed area 19.

In this manner, the central portion of the lubricating face 18a protrudes the amount L1 from the face of the straight path 9d to the inside of the turning corner 9, and each of the opposing ends 18b of the lubricating face 18a is located at the depth L2 of the recess area 19 below the outer face of the turning corner 9. Accordingly, even if a dimensional error is caused in the end cap 2 (3) or the lubricating member A and the amount of protrusion of the lubricating face 18a is increased with respect to the state shown in FIGS. 7 and 8, as long as the dimensional error in question is within the range of the depth L2 of the recessed area 19, a difference in level is not produced between the outer peripheral face of the turning corner 9 and the lubricating face 18a.

Conversely, even if a dimensional error leads to a decrease in the amount of protrusion of the lubricating 18a with respect to the state shown in FIGS. 7 and 8, as long as the dimensional error is within the range of the amount L1 of protrusion, the lubricating face 18a is reliably exposed to the inside of the turning corner 9, resulting in sufficient lubrication of the rolling elements 12.

In the range of the sum of the amount of protrusion of the lubricating face 18a (L1) and the depth of the recessed area 19 (L2), even if a dimensional error or an assembly error occurs in the end cap or the lubricating member A, the dimensional error can be absorbed by the recessed area 19.

In other words, even if the end cap 2 or the lubricating member A with approximately incorrect dimensions are made, a difference in level is not produced between the outer peripheral face of the turning corner 10 and the lubricating face 20. As a result, the rolling elements 12 can be sufficiently lubricated.

What is claimed is:

1. A slider for a linear motion rolling guide unit, comprising:
    a casing having rolling paths for guiding rolling elements;
    a pair of end caps fixed respectively to two opposing ends of the casing and having turning corners formed therein, the turning corners directly connecting with the rolling paths; and
    a lubricating member provided either one or both of the pair of end caps and having a lubricating face exposed on an outer peripheral face of each of the turning corners, the rolling paths and the turning corners forming circulation paths through which the rolling elements roll and circulate, the rolling elements making contact with the lubricating faces and being lubricated in the process of rolling through the turning corners,
    wherein each of the turning corners is made up of a pair of arced paths directly connecting with the rolling path of the casing, and a straight path providing a connection between the pair of the arced paths and extending in a direction approximately perpendicular to the rolling path,
    the lubricating member has a lubricating face exposed to the straight path and maintains a relation of the lubricating face intersecting the outer peripheral faces of the pair of the arced paths,
    and recessed areas are each formed between the outer peripheral face of each of the arced paths and the lubricating face in a surplus length region extending outward from each of the intersections between the lubricating face and the outer peripheral faces of the arced paths.

* * * * *